United States Patent
Ge et al.

(10) Patent No.: US 9,414,241 B2
(45) Date of Patent: Aug. 9, 2016

(54) METHOD AND APPARATUS FOR OUTER LOOP LINK ADAPTATION FOR A WIRELESS COMMUNICATION SYSTEM

(75) Inventors: Qingwei Ge, Beijing (CN); Gang Wang, Beijing (CN); Zhennian Sun, Beijing (CN); Ming Lei, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 80 days.

(21) Appl. No.: 14/345,568

(22) PCT Filed: Mar. 27, 2012

(86) PCT No.: PCT/CN2012/073118
§ 371 (c)(1),
(2), (4) Date: Sep. 2, 2014

(87) PCT Pub. No.: WO2013/143069
PCT Pub. Date: Oct. 3, 2013

(65) Prior Publication Data
US 2014/0369283 A1    Dec. 18, 2014

(51) Int. Cl.
*H04L 1/00* (2006.01)
*H04W 24/02* (2009.01)
(Continued)

(52) U.S. Cl.
CPC ............ *H04W 24/02* (2013.01); *H04B 7/0452* (2013.01); *H04W 72/082* (2013.01); *H04B 7/0413* (2013.01); *H04B 7/0689* (2013.01); *H04L 1/1867* (2013.01)

(58) Field of Classification Search
CPC ..... H04W 72/04; H04W 72/05; H04W 72/06; H04W 72/0446; H04W 72/0447; H04W 72/0448; H04W 52/40; H04W 52/41; H04W 52/42

USPC .......................... 370/329, 330, 334, 336, 348
See application file for complete search history.

(56) References Cited

U.S. PATENT DOCUMENTS

| 2004/0120411 A1* | 6/2004 | Walton | H04B 7/0417 |
| | | | 375/260 |
| 2008/0132281 A1* | 6/2008 | Kim | H04B 7/063 |
| | | | 455/562.1 |

(Continued)

FOREIGN PATENT DOCUMENTS

| CN | 101635608 A | 1/2010 |
| WO | 2010/148937 A1 | 12/2010 |
| WO | 2011/153729 A1 | 12/2011 |

OTHER PUBLICATIONS

International Search Report of PCT/CN2012/073118, dated Jan. 3, 2013.

*Primary Examiner* — Dady Chery
(74) *Attorney, Agent, or Firm* — Sughrue Mion, PLLC

(57) ABSTRACT

The present invention relates to a method for link adaptation in a wireless communication system. The method comprises: determining whether a UE operates in a SU-MIMO transmission mode or in a MU-MIMO transmission mode; applying, in responsive to determination that the UE operates in the SU-MIMO transmission mode, a SU-MIMO OLLA offset to a signal to interference and noise ratio adjusted with inner loop link adaptation; applying, in responsive to determination that the UE operates in the MU-MIMO transmission mode, a MU-MIMO OLLA offset to a signal to interference and noise ratio adjusted with inner loop link adaptation, wherein the MU-MIMO OLLA offset is based on the SU-MIMO OLLA offset and an extra offset which is indicative of inter-user interference, wherein the SU-MIMO OLLA offset and the extra offset are updated in responsive to receipt of an ACK/NACK message for a packet reported from the UE.

24 Claims, 5 Drawing Sheets

(51) Int. Cl.
 H04B 7/04 (2006.01)
 H04W 72/08 (2009.01)
 *H04B 7/06* (2006.01)
 *H04L 1/18* (2006.01)

(56) References Cited

U.S. PATENT DOCUMENTS

2008/0240216 A1* 10/2008 Kolding ............... H04L 1/0026
 375/227
2010/0322330 A1* 12/2010 Jongren .............. H04B 7/0452
 375/260
2011/0142147 A1* 6/2011 Chen ................. H04L 25/03343
 375/260
2011/0200131 A1* 8/2011 Gao ..................... H04B 7/0452
 375/267
2012/0257664 A1* 10/2012 Yue ...................... H04B 7/0452
 375/227
2013/0182569 A1* 7/2013 Bertrand ............... H04L 1/0009
 370/232
2013/0322276 A1* 12/2013 Pelletier .............. H04W 72/085
 370/252
2014/0226735 A1* 8/2014 Zhang ................. H04B 7/0452
 375/260

* cited by examiner

METHOD AND APPARATUS FOR OUTER LOOP LINK ADAPTATION FOR A WIRELESS COMMUNICATION SYSTEM

CROSS REFERENCE TO RELATED APPLICATIONS

This application is a National Stage of International Application No. PCT/CN2012/073118 filed Mar. 27, 2012, the contents of all of which are incorporated herein by reference in their entirety.

TECHNICAL FIELD

The present invention generally relates to a communication system, particularly to a method and apparatus for outer loop link adaptation (OLLA) in a wireless communication system.

DESCRIPTION OF THE RELATED ART

The Third Generation Partnership Project (3GPP) Standard for Long Term Evolution (LTE)/LTE-Advanced (LTE-A), also known as the evolution standard of the great success of $3^{rd}$ Generation technology, is aiming at creating a new series of specifications for the new evolving radio-access technology, which is able to provide higher bandwidth, lower latency, and better quality of service (QoS) guarantees.

In the cellular communication systems such as LTE/LTE-A systems, adaptive modulation coding (AMC) technology is adopted to suppress radio channel time variance. It is known that in so-called inner loop link adaptation (as opposed to outer loop link adaptation) methods, a quantized indication of channel quality such as Channel Quality Indicator (CQI) is reported from a user equipment (UE) to a corresponding base station such as an eNode B (eNB). The eNB estimates signal to interference plus noise ratio (SINR) of the UE based on the reported indication of channel quality such as CQI. The eNB establishes a mapping relationship between the levels of SINR and modulation and coding schemes (MSCs) in advance. As such, the eNS can determine a proper MCS for the uplink/downlink transmission of the UE by comparing the estimated SINR with the predetermined thresholds of SINR.

However, the estimated SINR may not be accurate due to some factors of un-modeled interferences and error, such as CQI estimation errors, CQI report and process delay, etc. This results in improper MCS selection, which then lowers down system spectrum efficiency.

As an effective way to compensate for the above-mentioned inaccuracy which may occur in the procedure of inner loop link adaptation, so-called outer loop link adaptation (OLLA) is adopted to add an offset to the estimated SINR. The OLLA offset is adjusted based on information of UE-reported acknowledgement (ACK) or non-acknowledgement (NACK) of transmitted packets. Accordingly, it facilitates keeping accumulated frame error rate (FER) around a pre-defined value. The MCS selection with OLLA-adjusted SINR is more accurate and therefore the spectrum efficiency of the communication system is improved.

Some wireless communication scenarios for example the Transmission Mode 8 of LTE Releases 9 and 10 allow UEs to switch dynamically between single-user multiple input multiple output (SU-MIMO) transmission mode and multi-user multiple input multiple output (MU-MIMO) transmission mode. Due to interlaced transmission periods between SU-MIMO and MU-MIMO experienced by the UE, the existing OLLA scheme cannot track the SINR offsets effectively for both transmission modes. In addition, the varying inter-user interferences are introduced in the MU-MIMO transmission mode by dynamic UE pairing, which is, however, not considered in the existing OLLA scheme.

Considering the facts as mentioned above, the existing OLLA scheme is not effective in the scenarios which allow UEs to switch between SU-MIMO and MU-MIMO transmission modes.

SUMMARY OF THE INVENTION

To solve the problems in the prior art, one or more method and apparatus embodiments according to the present invention aim to provide an OLLA scheme of a wireless communication system for the application scenarios where hybrid SU-MIMO and MU-MIMO transmission modes are supported and to provide more reliable MCS estimation and improve the system throughout.

According to an aspect of the present invention, an embodiment of the present invention provides a method for link adaptation in a wireless communication system. The method comprises: determining whether a UE operates in a SU-MIMO transmission mode or in a MU-MIMO transmission mode; applying, in responsive to determination that the UE operates in the SU-MIMO transmission mode, a SU-MIMO OLLA offset to a signal to interference and noise ratio adjusted with inner loop link adaptation; applying, in responsive to determination that the UE operates in the MU-MIMO transmission mode, a MU-MIMO OLLA offset to a signal to interference and noise ratio adjusted with inner loop link adaptation, wherein the MU-MIMO OLLA offset is based on the SU-MIMO OLLA offset and an extra offset which is indicative of inter-user interference, wherein the SU-MIMO OLLA offset and the extra offset are updated in responsive to receipt of an ACK/NACK message for a packet reported from the UE.

According to another aspect of the present invention, an embodiment of the present invention provides an apparatus for link adaptation in a wireless communication system. The apparatus comprises: means for determining whether a UE operates in a SU-MIMO transmission mode or in a MU-MIMO transmission mode; means for applying, in responsive to determination that the UE operates in the SU-MIMO transmission mode, a SU-MIMO OLLA offset to a signal to interference and noise ratio adjusted with inner loop link adaptation; means for applying, in responsive to determination that the UE operates in the MU-MIMO transmission mode, a MU-MIMO OLLA offset to a signal to interference and noise ratio adjusted with inner loop link adaptation, wherein the MU-MIMO OLLA offset is based on the SU-MIMO OLLA offset and an extra offset which is indicative of inter-user interference, wherein the apparatus further comprises means for updating the SU-MIMO OLLA offset and the extra offset are in responsive to receipt of an ACK/NACK message for a packet reported from the UE.

According to further aspect of the present invention, an embodiment of the present invention provides a base station in a wireless communication system performing the method for link adaptation according to an embodiment of the present invention.

According to further aspect of the present invention, an embodiment of the present invention provides a wireless communication system comprising a base station according to an embodiment of the present invention.

BRIEF DESCRIPTION OF THE DRAWINGS

Inventive features regarded as the characteristics of the present invention are set forth in the appended claims. However, the present invention, its implementation mode, other objectives, features and advantages will be better understood through reading the following detailed description on the exemplary embodiments with reference to the accompanying drawings, where in the drawings:

DETAILED DESCRIPTION OF THE PREFERRED EMBODIMENT

Hereinafter, embodiments of the present invention will be described with reference to the accompanying drawings. In the following description, many specific details are illustrated so as to understand the present invention more comprehensively. However, it is apparent to the skilled in the art that implementation of the present invention may not have these details. Additionally, it should be understood that the present invention is not limited to the particular embodiments as introduced here. On the contrary, any arbitrary combination of the following features and elements may be considered to implement and practice the present invention, regardless of whether they involve different embodiments. Thus, the following aspects, features, embodiments and advantages are only for illustrative purposes, and should not be understood as elements or limitations of the appended claims, unless otherwise explicitly specified in the claims.

Figure 1:
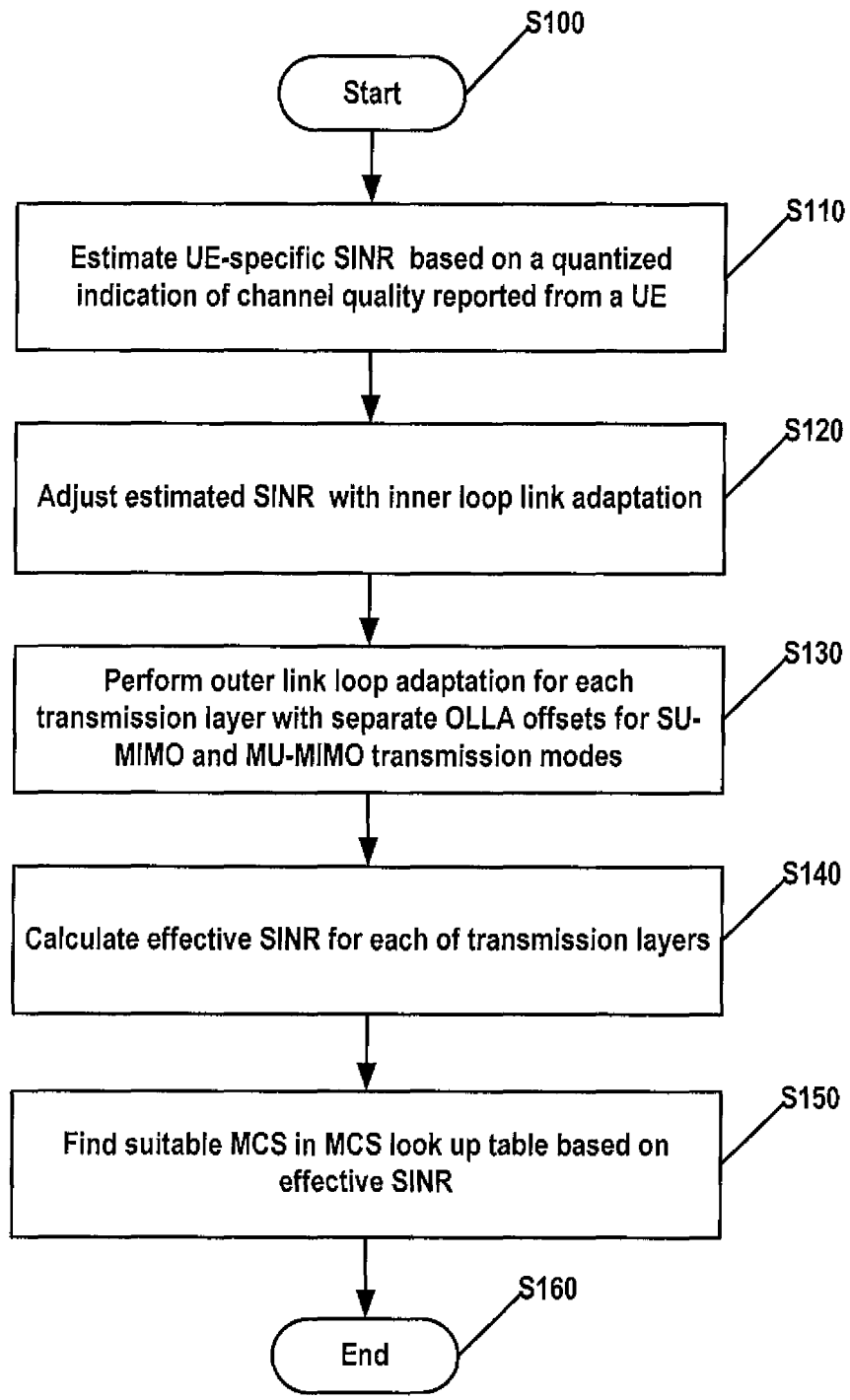
FIG. 1 illustrates a flow chart of a procedure of link modulation and coding adaptation according to an embodiment of the present invention.

FIG. 1 illustrates a flow chart of a procedure of link modulation and coding adaptation according to an embodiment of the present invention.

At step S100, the processing at an eNB for link modulation and coding adaptation starts.

At step S110, a UE-specific SINR for each of RBs assigned to a UE is estimated based on a quantized indication of channel quality such as CQI reported from a UE.

In the cellular communication systems with MIMO technologies, multiple antennas are used at both the transmitter and receiver. Spatial multiplexing results in increased data rate in bandwidth limited scenarios by creating several parallel "channels" between the transmitting antennas and the receiving antennas. The term "layer" or "transmission layer" refers to each of channels between the transmitting antennas and the receiving antennas. And the term "stream" or "data stream" refers to data transmitted on a transmission layer. In particular, in the MU-MIMO transmission mode, multiple users can share the parallel transmission layers on the same time-frequency resource by combining the spatial properties with the appropriate interference suppressing and receiver processing in order to improve the overall cell capacity.

At step S120, the estimated SINR is adjusted with inner loop link adaptation.

There are various algorithms of inner loop link adaptation in the art, some of which have been prevailed in the field and some of which may be developed for future use, etc. It is appreciated that the OLLA scheme according to the embodiments of the present invention can be used in conjunction with any kind of inner loop link adaptation without any limitation.

At step S130, a procedure of the outer link loop adaptation according to an embodiment of the present invention is performed, to obtain OLLA-adjusted SINR for each of transmission layers.

As discussed previously, some wireless communication scenarios for example Transmission Mode 8 of LTE Releases 9 and 10 allow UEs to switch dynamically between the SU-MIMO transmission mode and the MU-MIMO transmission mode. In the outer link loop adaptation scheme according to an embodiment of the present invention, separate OLLA offsets for the SU-MIMO and MU-MIMO transmission modes are adopted to track the SINR offsets effectively for both transmission modes. In the outer link loop adaptation scheme according to an embodiment of the present invention, it is proposed that a MU-MIMO OLLA offset for a transmission layer is based on the SU-MIMO OLLA offset for the transmission layer and an extra offset which is indicative of inter-user interference; and ACK/NACK messages for SU and MU packets are used to trigger OLLA offset updating procedure. The detailed procedure of OLLA according to embodiments of the present invention will be set forth with reference to FIGS. 2-4.

At step S140, an effective SINR per layer is calculated based on the OLLA-adjusted SINRs.

In the cellular communication systems, the eNB assigns resource blocks (RB) to UEs. A RB refers to a group of subcarriers over one subframe. And each UE can be assigned with multiple RBs for transmission. The eNB needs to determine the number of transmission layers of the UE and an effective SINR per layer.

The OLLA offset of SINR is applied before getting the effective SINR according to an embodiment of the present invention. On different RBs assigned to a UE, the UE might have different paring UEs. According to the strength of the inter-user interference, a different OLLA offsets depending on different paring manners can be applied to the SINR of the RB and then these OLLA-adjusted SINRs of the assigned RBs can be mapped into an effective SINR. Those skilled in the art may appreciate that it will be advantageous that the effective SINR is calculated taken into UEs' pairing matters in the MU-MIMO transmission mode.

At step S150, the calculated effective SINR is passed into the MCS look up table to find a suitable MCS for transmission.

At step S160, the processing ends.

Figure 2:
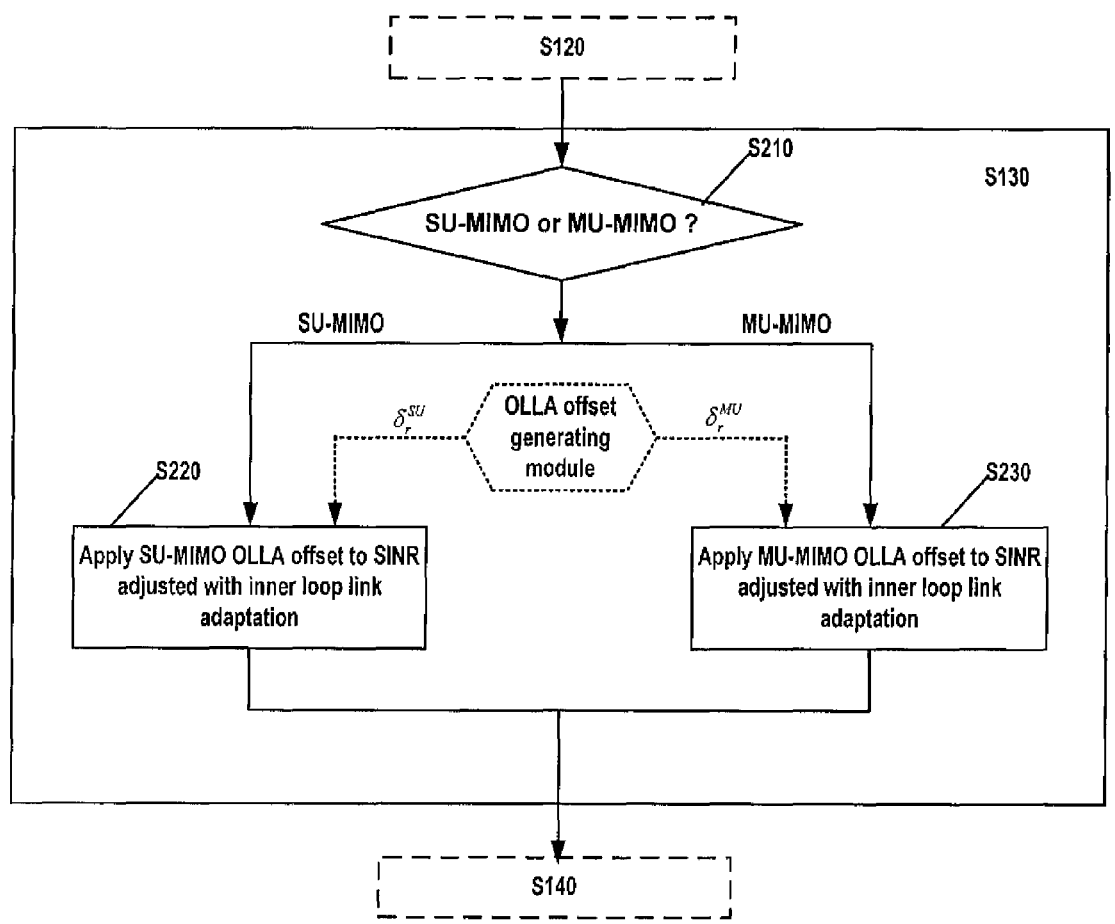
FIG. 2 illustrates a flow chart of a method of outer loop link adaptation according to an embodiment of the present invention.

FIG. 2 illustrates a flow chart of a method of outer loop link adaptation according to an embodiment of the present invention.

At step S210, it is determined whether the UE operates in a SU-MIMO transmission mode or in a MU-MIMO transmission mode.

At step S220, if it is determined that the UE operates in the SU-MIMO transmission mode, a SU-MIMO OLLA offset is applied to the SINR adjusted with inner loop link adaptation.

At step S230, if it is determined that UE operates in the MU-MIMO transmission mode, a MU-MIMO OLLA offset is applied to the SINR adjusted with inner loop link adaptation.

The SU-MIMO OLLA offset and MU-MIMO OLLA offset are determined by an OLLA offset generating module, wherein the MU-MIMO OLLA offset is determined based on the SU-MIMO OLLA offset and an extra offset which is indicative of inter-user interference and the SU-MIMO OLLA offset and the extra offset are updated in responsive to receipt of an ACK/NACK message for a packet reported from said UE. The functionality of the OLLA offset generating module will be discussed in details in conjunction with FIG. 3.

Figure 3:
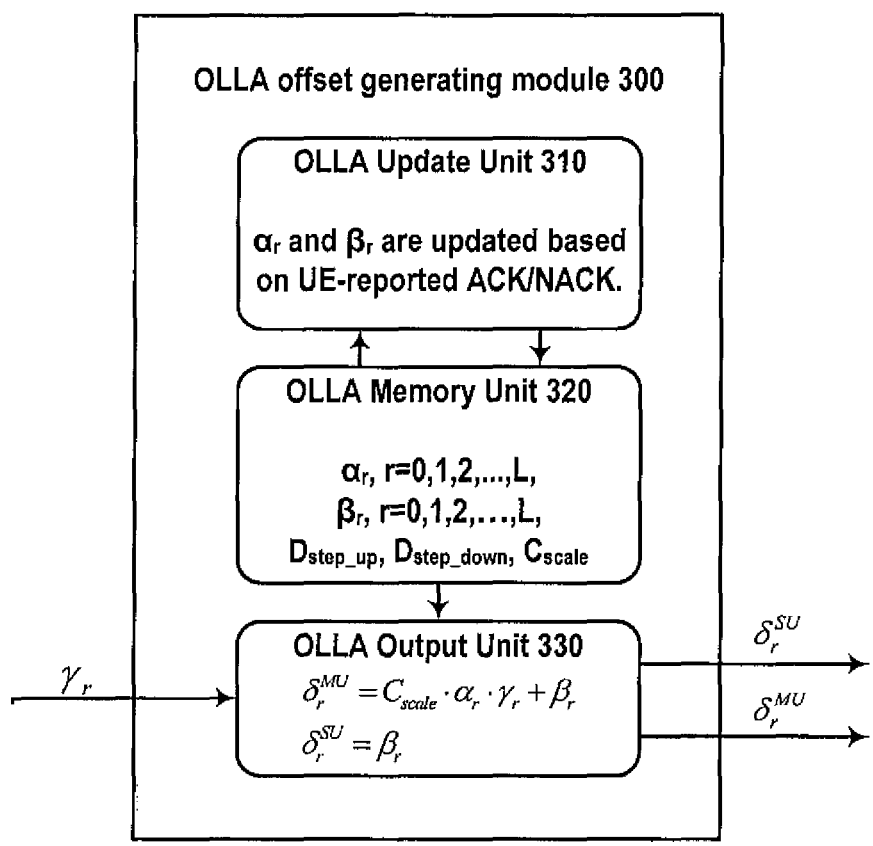
FIG. 3 schematically illustrates a block diagram of OLLA offset generating module according to an embodiment of the present invention.

FIG. 3 schematically illustrates a block diagram of OLLA offset generating module according to an embodiment of the present invention.

As shown in FIG. 3, reference numeral 300 denotes an OLLA offset generating module, which comprises an OLLA update unit 310, an OLLA memory unit 320 and an OLLA output unit 330.

The OLLA memory unit 320 is used to maintain parameters and values used to generate OLLA offsets. According to an embodiment of the present invention, the OLLA memory unit 320 maintains, for each of transmission layers, a respective SU-MIMO OLLA offset, which can be referred to as $\beta_r$, r=0, 1, 2, . . . , L, and a respective extra offset, which can be referred to as $\alpha_r$, r=0, 1, 2, . . . , L, wherein L is supported max number of transmission layers based on the UE capacity and the eNB configuration. Specifically, $\beta_0$ is the SU-MIMO OLLA offset for single-layer transmission, while $\beta_r$, r=1, 2, . . . , L, is the SU-MIMO OLLA offset for the corresponding $r^{th}$ transmission layer when there are multiple layers. Similarly, $\alpha_0$ is the extra offset of MU-MIMO transmission mode for single-layer transmission, while $\alpha_r$, r=1, 2, . . . , L, is the extra offset for the corresponding $r^{th}$ transmission layer when there are multiple layers.

According to an embodiment of the present invention, the OLLA memory unit 320 may maintain parameters which are utilized by the other units. In an exemplary implementation, the OLLA memory unit 320 may maintain the step sizes $D_{step\_up}$ and $D_{step\_down}$ for increasing and decrementing the OLLA offsets in the OLLA update unit 310. $D_{step\_up}$ and $D_{step\_down}$ may be constant or adaptive in responsive to the accumulated FER. In another exemplary implementation, the OLLA memory unit 320 may maintain a constant scalar $C_{scale}$, which is utilized by the OLLA output unit 330 to adjust the weight of the extra offset in the outputted MU-MIMO OLLA offset and will be discussed below.

The OLLA update unit 310 is used to update the SU-MIMO OLLA offset and the extra offset in responsive to receipt of an ACK/NACK message for a packet reported from a UE. Specifically, the OLLA update unit 310 updates a SU-MIMO OLLA offset $\beta_r$, r=0, 1, 2, . . . , L, and a extra offset $\alpha_r$, r=0, 1, 2, . . . , L, in responsive to an ACK/NACK message.

Figure 4:
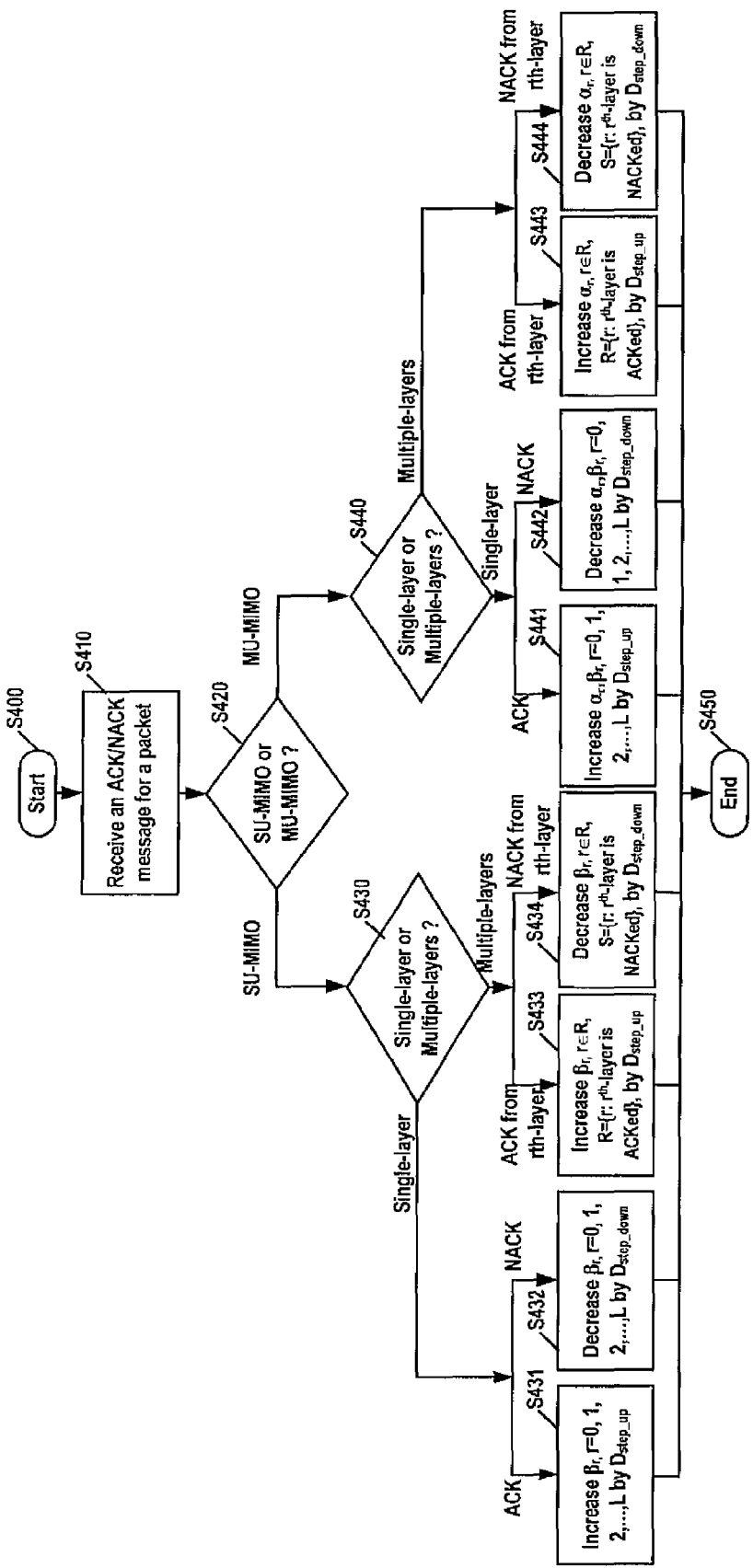
FIG. 4 illustrates a flow chart of a procedure of updating OLLA offsets according to an embodiment of the present invention.

Now, reference is made to FIG. 4 to set forth an exemplary procedure performed by the OLLA update unit 310 according to a preferred embodiment of the present invention.

As shown in FIG. 4, at step S400, the processing starts.

At step S410, an ACK/NACK message for a packet from a UE is received at the eNB.

At step S420, it is determined whether the UE sending the ACK/NACK message operates in the SU-MIMO transmission mode or in the MU-MIMO transmission mode.

In an exemplary implementation, the determination can be performed in such a matter that the eNB keeps records of whether packets are in the SU-MIMO transmission mode or in the MU-MIMO transmission mode and when the ACK/NACK for a packet is received, the eNB can make the determination and then carry out corresponding OLLA offset update steps.

If it is determined at step S420 that the UE operates in the SU-MIMO transmission mode, the processing proceeds with steps S430-S434.

At step 430, it is determined whether the UE is configured with a single-layer or multiple layers.

If it is determined that the US is configured with a single transmission layer, at steps S431 and S432, SU-MIMO OLLA offsets for all transmission layers with which said UE is configured are updated. Specifically, at step S431, in responsive to receipt of an ACK message of a packet from the UE, the SU-MIMO OLLA offsets for all transmission layers, i.e., $\beta_r$, r=0, 1, 2, . . . , L, which are maintained in the OLLA memory unit 320, are increased by $D_{step\_up}$. At step S432, in responsive to receipt of a NACK message of a packet from the UE, the SU-MIMO OLLA offsets for all transmission layers, i.e., $\beta_r$, r=0, 1, 2, . . . , L, which are maintained in the OLLA memory unit 320, are decreased by $D_{step\_down}$.

If it is determined that the UE is configured with multiple transmission layers, at steps S433 and S434, only the SU-MIMO OLLA offset for the transmission layer on which the ACK/NACK message is reported is updated. Specifically, at step S433, in responsive to receipt of an ACK message of a packet from the UE, the SU-MIMO OLLA offset for the transmission layer on which the ACK message is reported, i.e., $\beta_r$, r∈R, R={r: $r^{th}$-layer is ACKed}, which is maintained in the OLLA memory unit 320, is increased by $D_{step\_up}$. At Step S434, in responsive to receipt of a NACK message of a packet from the UE, the SU-MIMO OLLA offset for the transmission layer on which the NACK message is reported, i.e., $\beta_r$, r∈S, S={r:$r^{th}$-layer is NACKed}, which is maintained in the OLLA memory unit 320, is decreased by $D_{step\_down}$.

If it is determined at step S420 the UE operates in the MU-MIMO transmission mode, the processing proceeds with steps S440-S449.

At step 940, it is determined whether the UE is configured with a single-layer or multiple layers.

If it is determined that the UE is configured with a single transmission layer, at steps S441 and S442, SU-MIMO OLLA offsets and extra offsets for all transmission layers with which said UE is configured are updated. Specifically, at step S441, in responsive to receipt of an ACK message of a packet from the UE, the SU-MIMO OLLA offsets for all transmission layers, i.e., $\beta_r$, r=0, 1, 2, . . . , L, and the extra offsets for all transmission layers, i.e., $\alpha_r$, r=0, 1, 2, . . . , L, which are maintained in the OLLA memory unit 320, are all increased by $D_{step\_up}$. At step S442, in responsive to receipt of a NACK message of a packet from the UE, the SU-MIMO OLLA offsets for all transmission layers, i.e., $\beta_r$, r=0, 1, 2, . . . , L, and the extra offsets for all transmission layers, i.e., $\alpha_r$, r=0, 1, 2, . . . , L, which are maintained in the OLLA memory unit 320, are all decreased by $D_{step\_down}$.

If it is determined that the UE is configured with multiple transmission layers, at steps S993 and S5999, only the extra offset for the transmission layer on which the ACK/NACK message is reported is updated. Specifically, at step S443, in responsive to receipt of an ACK message of a packet from the UE, the extra offset for the transmission layer on which the ACK message is reported, i.e., $\alpha_r$, r∈R, R={r: $r^{th}$-layer is ACKed}, which is maintained in the OLLA memory unit 320, is increased by $D_{step\_up}$. At Step S444, in responsive to receipt of a NACK message of a packet from the UE, the extra offset for the transmission layer on which the NACK message is reported, i.e., $\alpha_r$, r∈S, S={r: $r^{th}$-layer is NACKed}, which is maintained in the OLLA memory unit 320, is decreased by $D_{step\_down}$.

At step S450, the processing ends.

The update step sizes $D_{step\_up}$ and $D_{step\_down}$ can be predefined and maintained in the OLLA Memory unit 320. According to an alternative implementation of the embodiment of the present invention, The update step sizes $D_{step\_up}$ and $D_{step\_down}$ is defined to meet following equation:

$$D_{step\_down} = D_{step\_up}/(1/FER-1),$$

wherein FER denotes a predefined value of Frame Error Rate.

According to the update procedure as shown in FIG. 4, it can be noted that for transmission with multiple layers, only those offset corresponding to those specific layers are updated, while for single-layer transmission, offsets for all of the transmission layers are updated. The reason for doing so is that although only a single layer is configured of the concerned UE during single layer transmission, the fluctuations of the time varying channel experienced by the UE on this layer are also true to all of the layers if there are multiple layers configured. As such, the procedure helps the eNB to keep the OLLA offsets for multiple layers correctly tracking the channel condition during single layer transmissions, which is important for the OLLA effectiveness.

Furthermore, according to the update procedure as shown in FIG. 4, it can also be noted that in the single-layer transmission case, for an ACK/NACK message of the SU-MIMO packets, the SU-MIMO OLLA offsets for all transmission layers, i.e., $\beta_r$, r=0, 1, 2, . . . , L, are updated, while for an ACK/NACK massage of the MU-MIMO packets, both the SU-MIMO OLLA offsets for all transmission layers, i.e., $\beta_r$, r=0, 1, 2, . . . , L, and the extra offsets for all transmission layers, i.e., $\alpha_r$, r=0, 1, 2, . . . , L, are updated. As such, during the interlaced transmission periods between SU-MIMO and MU-MIMO transmission modes, even if the UE currently operates in MU-MIMO transmission mode, the eNB is able to update the SU-MIMO OLLA offsets based on ACK/NACK message of the MU-MIMO packets. Therefore the OLLA offsets for SU-MIMO can still track the channel fluctuations even during MU-MIMO transmission period. This is especially important for quick convergence of the OLLA offsets when a UE switches from MU-MIMO transmission mode to SU-MIMO transmission mode.

Returning now to FIG. 3, the OLLA output unit 330 generates OLLA offsets (dB) used in the SU-MIMO and MU-MIMO transmission modes based on the OLLA offset values and parameters maintained in the OLLA memory unit 320, wherein the SU-MIMO OLLA offset $\delta_0^{SU}$ for the single transmission layer can be denoted as:

$$\delta_0^{SU}=\beta_0, \quad\quad 1)$$

the SU-MIMO OLLA offset $\delta_r^{SU}$ for the corresponding $r^{th}$ transmission layer, when there are multiple layers, can be denoted as:

$$\delta_r^{SU}=\beta_r, r=1,2,\ldots,L; \quad\quad 2)$$

the MU-MIMO OLLA offset $\delta_0^{MU}$ for the single transmission layer can be denoted as:

$$\delta_0^{MU}=\alpha_0+\beta_0; \quad\quad 3)$$

the MU-MIMO OLLA offset $\delta_r^{MU}$ for the corresponding $r^{th}$ transmission layer, when there are multiple layers, can be denoted as:

$$\delta_r^{MU}=\alpha_r+\beta_r, r=1,2,\ldots,L, \quad\quad 4)$$

wherein L is supported max number of transmission layers based on the UE capacity and the eNB configuration.

For the purpose of simplicity, equations 1) and 2) can be combined and denoted as:

$$\delta_r^{SU}=\beta_r, r=1,2,\ldots,L; \quad\quad 5)$$

and equations 3) and 4) can be combined and denoted as:

$$\delta_r^{MU}=\alpha_r+\beta_r, r=0,1,2,\ldots,L, \quad\quad 6)$$

In a preferred embodiment of the present invention, the OLLA output unit 330 can determine the MU-MIMO OLLA offset for corresponding transmission layer by modifying the extra offset with an index indicative of orthogonality of co-scheduled UEs on a RB. For example, an orthogonality index for beamforming vectors of the co-scheduled UEs $\gamma_r$ can be introduced to modify the extra offset $\alpha_r$, so that the modified MU-MIMO OLLA offset may reflect the varying inter-user interference caused by dynamic UE pairing in the MU-MIMO transmission mode.

Preferably, the extra offset may be further modified with a constant scalar to ensure that the extra offset is not greater than the SU-MIMO OLLA offset.

According to the preferred embodiment, the equation 6) can be optimized as $$\delta_r^{MU}=C_{scale}\cdot\gamma_r\cdot\alpha_r\cdot\beta_r, r=0,1,2,\ldots,L, \quad\quad 7)$$

wherein L is supported max number of transmission layers based on the UE capacity and the eNB configuration; $\gamma_r$ is an orthogonality index for the beamforming vectors of the co-scheduled UE, which can be used as a strength measurement of inter-user interference; $C_{scale}$ is a constant scalar such that $0 < C_{scale} \cdot \gamma_r \le 1$.

In an exemplary implementation of the preferred embodiment of the present invention, $\gamma_r$ can be provided to the OLLA output unit 330 by a UE pairing module in the eNB, such as the scheduler of the eNB.

Suppose there are M UEs co-scheduled on the same RB, then for the concerned UE, $$\gamma_r = \frac{1}{M-1}\sum_{m=1}^{M-1}\|V_{0,r}V_{m,r}\|^2, \quad\quad 8)$$

wherein $V_{0,r}$ and $V_{m,r}$ are the normalized beamforming weights of the $r^{th}$ layer of the concerned UE and the $m^{th}$ co-scheduled UE on a RB, respectively. It is appreciated that RB index is omitted here, for the purpose of simplicity.

In an exemplary implantation of the preferred embodiment of the present invention, $C_{scale}$ can be chosen in advance and maintained in the OLLA memory unit 320. For example, $C_{scale}$ can be chosen to meet following equation:

$$C_{scale}=M/T_{threshold} \quad\quad 9)$$

where M is the number of co-scheduled UEs on the same resource, and $T_{threshold}$ is the threshold on the beamforming weight correlation between two UEs.

Only if $\|V_{i,r}V_{j,r}\|^2<$Threshold, then UE i and UE j will be co-scheduled on the same RB. Thus the max value of $\gamma_r$ is $T_{threshold}$. M is to account for the power split between the M co-scheduled UEs.

For example, in Transmission Mode 8 of LTE Release 9, it is specified that M=2, $T_{threshold}$=0.3. Therefore, $C_{scale}$=2/0.3=6.67. In this example, It can be seen that $C_{scale}$ is chosen for following reasons:

1. $V_{1,r}$ and $V_{1,r}$ are first normalized and a BF correlation threshold 0.3 is used to rule out UEs whose BF weights are not orthogonal enough; and 2. then $V_{0,r}$ and $V_{1,r}$ are scaled by 1/sqrt(2) to account for power split between the two co-scheduled MU-MIMO UEs.

Those skilled in the art may appreciate that the preferred embodiments of the present invention as described above are only intended to provide non-limiting examples to illustrate how to optimize the MU-MIMO OLLA offset by modifying the extra offset. However, depending on practical use, those skilled in the art may choose one or more optimal scaling factors other than the above-described ones to optimize the extra offset, or even choose not to use any optimal scaling factors at all. Consequently, the features described in the preferred embodiments of the present invention should be regarded as being not indispensable but alternative and/or preferable to the overall solution.

Figure 5:
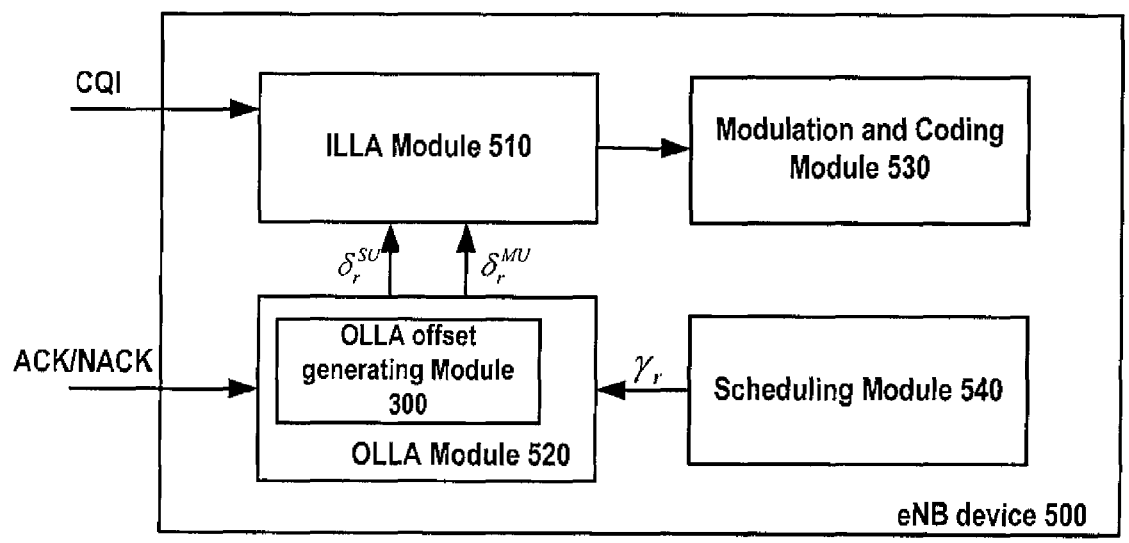
FIG. 5 schematically illustrates a block diagram of an eNB device according to an embodiment of the present invention.

FIG. 5 schematically illustrates a block diagram of an eNB device according to an embodiment of the present invention.

As shown in FIG. 5, reference numeral 500 denotes an eNB device according to an embodiment of the present invention. The eNB device comprises an inner loop link adaptation (ILLA) module 510, an outer loop link adaptation (OLLA) module 520, a modulation and coding module 530, and a scheduling module 540.

The ILLA module 510 is configured to perform estimation of UE-specific SINR for each of RBs assigned to a UE, based on a quantized indication of channel quality such as CQI reported from a UE. The ILLA module 510 performs inner loop link adaptation to adjust the estimated SINR.

The OLLA module 520 is configured to perform outer loop link adaptation according to embodiments of the present invention, to obtain OLLA-adjusted SINR for each of transmission layers. An exemplary operation of the OLLA module 520 is depicted in FIG. 2. The OLLA module 520 determines whether the UE operates in a SU-MIMO transmission mode or in a MU-MIMO transmission mode. Depending on the result of determination, the OLLA module 520 applies a SU-MIMO OLLA offset or a MU-MIMO OLLA offset generated by the OLLA offset generating module 300 to the SINR adjusted by the ILLA module 510, respectively.

The OLLA offset generating module 300 of exemplary embodiments of the present invention has been described above in connection with FIG. 3. In the OLLA offset generating module 300, the MU-MIMO OLLA offset $\delta_r^{MU}$ is determined based on the SU-MIMO OLLA offset $\delta_r^{SU} = \beta_r$ and an extra offset $\alpha_r$ which is indicative of inter-user interference and the SU-MIMO OLLA offset $\beta_r$ and the extra offset $\alpha_r$ are updated in responsive to receipt of an ACK/NACK message for a packet reported from said UE, for example, according to the processing illustrated in FIG. 4. According to a preferred embodiment of the present invention, the extra offset $\alpha_r$ can be modified with an index indicative of orthogonality of co-scheduled UEs on a RB. As an example, an orthogonality index for beamforming vectors of the co-scheduled UE $\gamma_r$ can be provided from the scheduling module 540 to the OLLA offset generating module 300 of the OLLA module 520 to modify the extra offset $\alpha_r$. Preferably, the extra offset $\alpha_r$ may further modified with a constant scalar to ensure that the extra offset is not greater than the SU-MIMO OLLA offset. Therefore, according to the preferred embodiment, the MU-MIMO OLLA offset $\delta_r^{MU}$ for corresponding transmission layer can be denoted as $$\delta_r^{MU} = C_{scale} \cdot \gamma_r \cdot \alpha_r + \beta_r, \ r = 0, 1, 2, \ldots, L,$$

wherein L is supported max number of transmission layers based on the UE capacity and the eNB configuration; $\gamma_r$ is an orthogonality index for the beamforming vectors of the co-scheduled UE, which can be used as a strength measurement of inter-user interference; $C_{scale}$ is a constant scalar such that $0 < C_{scale} \cdot \gamma_r \leq 1$.

The ILLA module 510 is configured to calculate an effective SINR based on OLLA-adjusted SINRs from the OLLA module 520. Then, a suitable MCS for transmission can be determined from a MCS lookup table and used in the modulation and coding module 530.

Here, the eNB device 500 is described with the modules or components which are most relevant to the embodiments of the present invention. However, those skilled in the art can appreciate that the eNB device 500 also comprises other modules and components for performing the functionality of cellular communication, including antennas; transceiver (having a transmitter (TX) and a receiver (RX)); processors such as one or more of general purpose computers, special purpose computers, microprocessors, digital signal processors (DSPs) and processors based on multi-core processor architecture; memory module be of any type suitable to the local technical environment and may be implemented using any suitable data storage technology; etc. Those modules or components are well known in the art and the description thereof is omitted for the purpose of conciseness.

A link adaptation processing in an eNB according to an embodiment of the present invention has been depicted in detail with reference to FIGS. 1, 2 and 4. It should be noted that the above depiction is only exemplary, not intended for limiting the present invention. In other embodiments of the present invention, this method may have more, or less, or different steps, and numbering the steps is only for making the depiction more concise and much clearer, but not for stringently limiting the sequence between each steps, while the sequence of steps may be different from the depiction. For example, in some embodiments, the above one or more optional steps may be omitted. Specific embodiment of each step may be different from the depiction. All these variations fall within the spirit and scope of the present invention.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block and signaling diagrams, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. As well known in the art, the design of integrated circuits is by and large a highly automated process.

The present invention may also be embodied in the computer program product which comprises all features capable of implementing the method as depicted herein and may implement the method when loaded to the computer system.

The present invention has been specifically illustrated and explained with reference to the preferred embodiments. The skilled in the art should understand various changes thereto in form and details may be made without departing from the spirit and scope of the present invention.

What is claimed is:

1. A method for link adaptation in a wireless communication system, comprising:
    determining whether a UE operates in a SU-MIMO transmission mode or in a MU-MIMO transmission mode;
    applying, in responsive to determination that said UE operates in the SU-MIMO transmission mode, a SU-MIMO OUTER LOOP LINK ADAPTATION (OLLA) offset to a signal to interference and noise ratio adjusted with inner loop link adaptation;
    applying, in responsive to determination that said UE operates in the MU-MIMO transmission mode, a MU-MIMO OLLA offset to a signal to interference and noise ratio adjusted with inner loop link adaptation,
wherein said MU-MIMO OLLA offset is based on said SU-MIMO OLLA offset and an extra offset which is indicative of inter-user interference,
wherein said SU-MIMO OLLA offset and said extra offset are updated in responsive to receipt of an ACK/NACK message for a packet reported from said UE.

2. The method according to claim 1, further comprising: maintaining, for each of transmission layers, a respective SU-MIMO OLLA offset and extra offset.

3. The method according to claim 2, wherein updating said SU-MIMO OLLA offset and said extra offset further comprises:
in responsive to determination that said UE operates in the SU-MIMO transmission mode:
determining whether said UE is configured with a single transmission layer or multiple transmission layers;
updating, in responsive of determination that said UE is configured with a single transmission layer, SU-MIMO OLLA offsets for all transmission layers with which said UE is configured; and
updating, in responsive of determination that said UE is configured with multiple transmission layers, the SU-MIMO OLLA offset for the transmission layer on which said ACK/NACK message is reported.

4. The method according to claim 2, wherein updating said SU-MIMO OLLA offset and said extra offset further comprises:
in responsive to determination that said UE operates in the MU-MIMO transmission mode:
determining whether said UE is configured with a single transmission layer or multiple transmission layers;
updating, in responsive to determination that said UE is configured with a single transmission layer, SU-MIMO OLLA offsets and extra offsets for all transmission layers with which said UE is configured; and
updating, in responsive to determination that said UE is configured with multiple transmission layers, the extra offset for the transmission layer on which said ACK/NACK message is reported.

5. The method according to claim 1, wherein updating said SU-MIMO OLLA offset and said extra offset further comprises:
increasing, in responsive to receipt of a ACK message reported from said UE, at least one offset to be updated by a first update step size;
decreasing, in responsive to receipt of a NACK message reported from said UE, at least one offset to be updated by a second update step size.

6. The method according to claim 5, wherein said first and second update step sizes $D_{step\_up}$ and $D_{step\_down}$ meet the equation below:

$$D_{step\_down} = D_{step\_up}/(1/FER - 1),$$

wherein FER denotes a predefined value of Frame Error Rate.

7. The method according to claim 6, further comprising: modifying said extra offset with a constant scalar to ensure that said extra offset is not greater than said SU-MIMO OLLA offset.

8. The method according to claim 7, wherein: said constant scalar $C_{scale}$ is determined by $$C_{scale} = M/T_{threshold},$$

where M is the number of co-scheduled UEs on the same resource block, and $T_{threshold}$ is the threshold on the beamforming weight correlation between two UEs.

9. The method according to claim 1, further comprising: modifying said extra offset with an index indicative of orthogonality of co-scheduled UEs on a resource block.

10. The method according to claim 9, wherein: said index indicative of orthogonality of co-scheduled UEs on a resource block is an orthogonality index for beamforming vectors of the co-scheduled UEs $\gamma_r$, $$\gamma_r = \frac{1}{M-1} \sum_{m=1}^{M-1} \|V_{0,r} V_{m,r}\|^2,$$

wherein M is the number of UEs co-scheduled on a same recourse block; $V_{0,r}$ and $V_{m,r}$ are the normalized beamforming weights of the $r^{th}$ layer of the concerned UE and the $m^{th}$ co-scheduled UE on a resource block, respectively.

11. The method according to claim 1, further comprising:
calculating an effective SINR based on OLLA-adjusted SINRs;
determining a modulation and coding scheme based on said effective SINR.

12. An apparatus for link adaptation in a wireless communication system, comprising:
at least one memory operable to store program code;
at least one processor operable to read said program code and operate as instructed by said program code comprising:
determining code configured to cause the at least one process to determine whether a UE operates in a SU-MIMO transmission mode or in a MU-MIMO transmission mode;
applying code configured to cause the at least one process to apply, in responsive to determination that said UE operates in the SU-MIMO transmission mode, a SU-MIMO OUTER LOOP LINK ADAPTATION (OLLA) offset to a signal to interference and noise ratio adjusted with inner loop link adaptation;
applying code configured to cause the at least one process to apply, in responsive to determination that said UE operates in the MU-MIMO transmission mode, a MU-MIMO OLLA offset to a signal to interference and noise ratio adjusted with inner loop link adaptation,
wherein said MU-MIMO OLLA offset is based on said SU-MIMO OLLA offset and an extra offset which is indicative of inter-user interference,
wherein said apparatus further comprises updating code configured to cause the at least one process to update said SU-MIMO OLLA offset and said extra offset in response to receipt of an ACK/NACK message for a packet reported from said UE.

13. The apparatus according to claim 12, further comprising:
maintaining code configured to cause the at least one process to maintain, for each of transmission layers, a respective SU-MIMO OLLA offset and extra offset.

14. The apparatus according to claim 13, wherein the updating code is further configured to:
in response to a determination that said UE operates in the SU-MIMO transmission mode:
determine whether said UE is configured with a single transmission layer or multiple transmission layers;

update, in response to the determination that said UE is configured with a single transmission layer, SU-MIMO OLLA offsets for all transmission layers with which said UE is configured; and update, in response to the determination that said UE is configured with multiple transmission layers, the SU-MIMO OLLA offset for the transmission layer on which said ACK/NACK message is reported.

15. The apparatus according to claim 13, wherein the updating code further configured to:

in response to a determination that said UE operates in the MU-MIMO transmission mode:

determine whether said UE is configured with a single transmission layer or multiple transmission layers;

update, in response to determination that said UE is configured with a single transmission layer, SU-MIMO OLLA offsets and extra offsets for all transmission layers with which said UE is configured; and update, in response to determination that said UE is configured with multiple transmission layers, the extra offset for the transmission layer on which said ACK/NACK message is reported.

16. The apparatus according to claim 12, wherein the updating code further configured to:

increase, in response to receipt of a ACK message reported from said UE, at least one offset to be updated by a first update step size;

decrease, in response to receipt of a NACK message reported from said UE, at least one offset to be updated by a second update step size.

17. The apparatus according to claim 16, wherein said first and second update step sizes $D_{step\_up}$ and $D_{step\_down}$ meet the equation below:

$$D_{step\_down} = D_{step\_up}/(1/\text{FER}-1),$$

wherein FER denotes a predefined value of Frame Error Rate.

18. The apparatus according to claim 17, further comprising:

modifying coding configured to cause the at least one process to modify said extra offset with a constant scalar to ensure that said extra offset is not greater than said SU-MIMO OLLA offset.

19. The apparatus according to claim 18, wherein:

said constant scalar $C_{scale}$ is determined by $$C_{scale} = M/T_{threshold},$$

where M is the number of co-scheduled UEs on the same resource block, and $T_{threshold}$ is the threshold on the beamforming weight correlation between two UEs.

20. The apparatus according to claim 12, further comprising:

modifying code configured to cause the at least one process to modify said extra offset with an index indicative of orthogonality of co-scheduled UEs on a resource block.

21. The apparatus according to claim 20, wherein:

said index indicative of orthogonality of co-scheduled UEs on a resource block is an orthogonality index for beamforming vectors of the co-scheduled UEs $\gamma_r$, $$\gamma_r = \frac{1}{M-1} \sum_{m=1}^{M-1} \|V_{0,r} V_{m,r}\|^2,$$

wherein M is the number of UEs co-scheduled on a same recourse block; $V_{0,r}$ and $V_{m,r}$ are the normalized beamforming weights of the $r^{th}$ layer of the concerned UE and the $m^{th}$ co-scheduled UE on a resource block, respectively.

22. The apparatus according to claim 12, further comprising:

calculating code configured to cause the at least one process to calculate an effective SINR based on OLLA-adjusted SINRs; and determining code configured to cause the at least one process to determine a modulation and coding scheme based on said effective SINR.

23. A base station in a wireless communication system, comprising:

at least one processor; and at least one memory including computer program code, wherein the at least one memory and the computer program code are configured to, with the at least one processor, perform the method for link adaptation comprising:

determining whether a UE operates in a SU-MIMO transmission mode or in a MU-MIMO transmission mode;

applying, in response to determination that said UE operates in the SU-MIMO transmission mode, a SU-MIMO OUTER LOOP LINK ADAPTATIOON (OLLA) offset to a signal to interference and noise ratio adjusted with inner loop link adaptation;

applying, in responsive to determination that said UE operates in the MU-MIMO transmission mode, a MU-MIMO OLLA offset to a signal to interference and noise ratio adjusted with inner loop link adaptation, wherein said MU-MIMO OLLA offset is based on said SU-MIMO OLLA offset and an extra offset which is indicative of inter-user interference, wherein said SU-MIMO OLLA offset and said extra offset are updated in responsive to receipt of an ACK/NACK message for a packet report from said UE.

24. A wireless communication system, comprising a base station, the base station comprising:

at least one processor; and at least one memory including computer program code, wherein the at least one memory and the computer program code are configured to, with the at least one processor, perform the method for link adaptation comprising:

determining whether a UE operates in a SU-MIMO transmission mode or in a MU-MIMO transmission mode;

applying, in responsive to determination that said UE operates in the SU-MIMO transmission mode, a SU-MIMO OUTER LOOP LINK ADAPTATION (OLLA) offset to a signal to interference and noise ratio adjusted with inner loop link adaptation;

applying, in responsive to determination that said UE operates in the MU-MIMO transmission mode, a MU-MIMO OLLA offset to a signal to interference and noise ratio adjusted with inner loop link adaptation, wherein said MU-MIMO OLLA offset is based on said SU-MIMO OLLA offset and an extra offset which is indicative of inter-user interference, wherein said SU-MIMO OLLA offset and said extra offset are updated in responsive to receipt of an ACK/NACK message for a packet reported from said UE.

* * * * *